(12) United States Patent
Campbell (10) Patent No.: US 8,446,635 B2
(45) Date of Patent: May 21, 2013

(54) RETURN LABEL GENERATION

(75) Inventor: Richard Alan Campbell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 475 days.

(21) Appl. No.: 12/771,328

(22) Filed: Apr. 30, 2010

(65) Prior Publication Data

US 2011/0267631 A1 Nov. 3, 2011

(51) Int. Cl.
*G06F 15/00* (2006.01)
*G03G 15/00* (2006.01)
*G06K 15/00* (2006.01)

(52) U.S. Cl.
USPC .............................. 358/1.9; 358/1.14; 399/12

(58) Field of Classification Search
USPC .................. 358/1.9, 1.14; 399/12, 24, 11, 25, 399/26, 27, 411
See application file for complete search history.

(56) References Cited

U.S. PATENT DOCUMENTS

| | | | |
|---|---|---|---|
| 6,234,220 B1 | 5/2001 | Davis et al. | |
| 6,532,346 B2 * | 3/2003 | Gallivan | 399/12 |
| 6,927,555 B2 | 8/2005 | Johnson | |
| 7,287,175 B2 | 10/2007 | Vereen et al. | |
| 7,409,353 B1 | 8/2008 | Uslontsev et al. | |
| 7,624,025 B2 | 11/2009 | Uslontsev et al. | |
| 2007/0174652 A1 | 7/2007 | Padilla | |
| 2008/0005522 A1 | 1/2008 | Paladini et al. | |

FOREIGN PATENT DOCUMENTS

| | | |
|---|---|---|
| GB | 2 411 325 | 8/2005 |
| KR | 20050023822 | 3/2005 |

* cited by examiner

*Primary Examiner* — Charlotte M Baker
(74) *Attorney, Agent, or Firm* — Gibb & Riley, LLC (57) ABSTRACT

A method and apparatus sense the replacement of a used component with a new component within the apparatus using sensors within the apparatus. The method/apparatus can then automatically display a message on a graphic user interface of the apparatus in response to the sensing of the replacement. This message provides information for recycling the used component, and the message provides a shipping option for shipping the used component to an appropriate recycling location. If the shipping option is selected, the method/apparatus retrieves a shipping address from memory within the apparatus and prints a shipping label for shipping the used component to the recycling location using a printing engine operatively connected to the apparatus.

18 Claims, 6 Drawing Sheets

FIG. 1

You have just replaced the CRU.
The proper handling of a used CRU from this equipment is to return it to Xerox for recycling.
This helps us hold down our costs and reinforces our commitment to a "green" business.

Would you like to print a shipping label to ensure that this happens correctly?

Confirm    Cancel

FIG. 2

You have chosen to cancel printing a return label to ensure correct handling of the replaced component.

Would you like to save this operation until later, or cancel?

Save    Cancel

You are replacing a CRU which still has some
usefulness. Are you certain that you want
to replace this item?
Using this item to completion helps us
hold down our costs and reinforces
our commitment to a "green" business.

Would you like to reinstall this item and run
it until it is no longer useful?

[ Reinstall ]    [ Return ]

FIG. 8

RETURN LABEL GENERATION

BACKGROUND AND SUMMARY

Embodiments herein generally relate to a printing apparatus and the recycling of exhaustible modules (modules that are regularly replaced) and, more particularly, relates to systems and methods that detect when a component has been replaced and that offer the user an option to automatically print a return label to ensure that the used component is recycled or disposed of properly.

The components that are replaced within an apparatus are sometimes herein referred to as an exhaustible module or customer replaceable units (CRU). Such components comprise material to be consumed and/or parts that will wear out. When the material is consumed and/or the parts are worn out, the exhaustible module is replaced by the end user of the printing device.

Some replacement modules are shipped to the customer with return shipping labels in the box for customer use in returning the units. Alternatively, instruction sheets are sometimes included with the replacement module directing the customers to a website from which a shipping label may be printed. Including such labels and instructions adds to manufacturing cost and complexity.

Thus, current practices include a variety of methods of supplying the customer with return shipping labels including putting a label in a box, on a box, on a part, colored labels, peel off labels, double labels, printing labels from a web site, etc., to indicate where, when, what and how a supply, consumable, or spare is returned to the manufacturer or other recycler, or is sent to a landfill. The variety of processes are often confusing to the customer and time consuming. Further, pre-printed labels are often lost or damaged, and many items are disposed of improperly or not returned.

In view of the foregoing issues, one exemplary method embodiment herein senses the replacement of a used component with a new component (within an apparatus, such as a printing apparatus) using sensors within the apparatus. The method can then automatically display a message on a graphic user interface of the apparatus in response to the sensing of the replacement.

This message provides information for recycling the used component, and the message provides a shipping option for shipping the used component to an appropriate recycling location. The message can also provide an option to accumulate a plurality of used components and to print the shipping label at a later time after a sufficient quantity of the used components has been accumulated to allow the user to perform their recycling activities all at once in a batch form of activity. Further, embodiments herein can provide reminder messages to print the shipping label if the option to accumulate was previously selected.

If the shipping option is selected, the method retrieves a shipping address from memory within the apparatus or some external source and prints a shipping label for shipping the used component to the recycling location using a printing engine operatively connected to the apparatus (or positioned within the apparatus if, for example, the apparatus is the printing apparatus).

There may be multiple geographic locations that accept the same component, and these multiple geographic locations may be stored within the memory of the apparatus. When retrieving the shipping address from memory within the apparatus, the embodiments herein can select the recycler location from such a plurality of recycling locations using the processor within the apparatus. Further, when making this selection, the processor maintains a known geographical location of the printing apparatus and selects the recycler location to which shipping will occur based upon a closest proximity measurement between the geographical location of the printing apparatus and a geographical location of the recycler.

One exemplary apparatus herein (such as a printing apparatus) includes a processor. Sensors that are positioned within the printing apparatus are operatively connected to (directly or indirectly connected to) the processor. The sensors detect replacement of a used component with a new component within the apparatus.

A graphic user interface is also operatively connected to the processor. The graphic user interface automatically displays a message in response to the sensing of the replacement of the used component as directed by the processor. As mentioned above, the message provides information for recycling the used component, and the message provides a shipping option for shipping the used component to an appropriate recycling location.

A computer readable storage medium within the printing apparatus is operatively connected to the processor. The computer readable storage medium stores shipping addresses for different components within the printing apparatus. Further, a printing engine can be positioned within the apparatus, and is also operatively connected to the processor, the printing engine prints a shipping label for shipping the used component to the recycling location based on the shipping addresses within the computer readable storage medium, if the shipping option is selected.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, providing the knowledge as well as an easy and convenient way for customers to return, recycle or scrap products includes the ability to conveniently provide a shipping label to assist the customer in dispositioning various used components of an apparatus they have replaced. Therefore, the embodiments herein use reminders, directions, and instructions displayed on the user interface to inform the customer how to dispose of, or return products and, print a label to ship it correctly.

Figure 1:
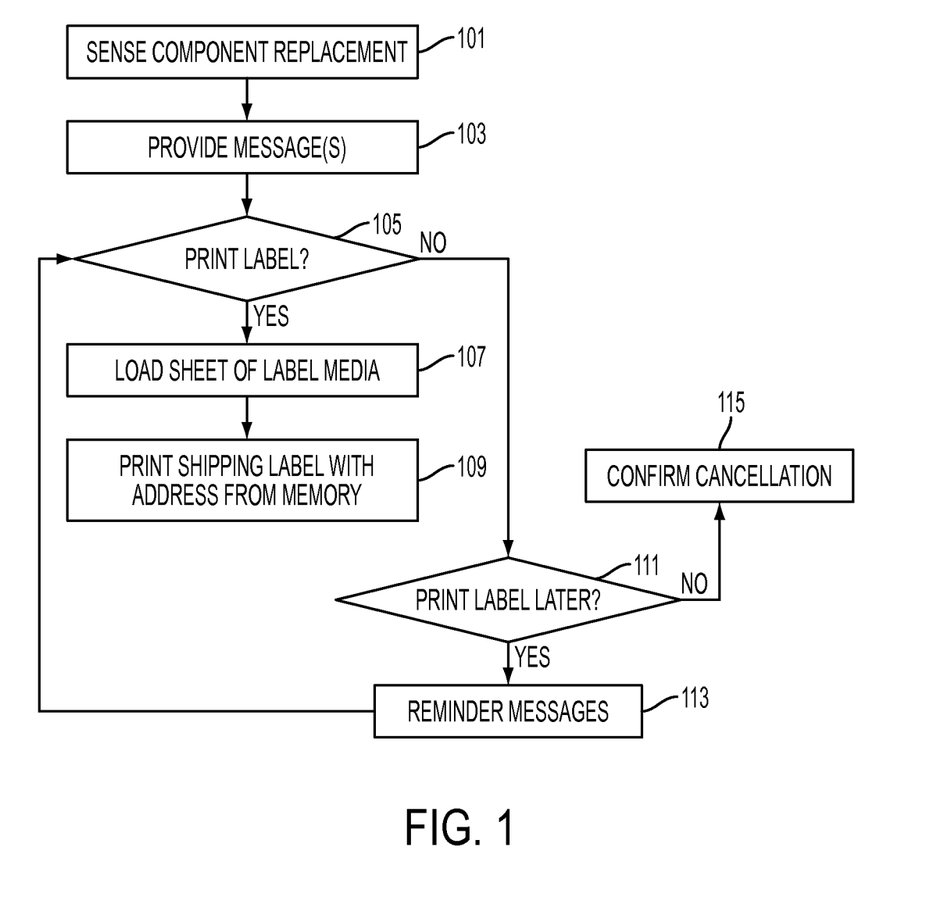
FIG. 1 is a flow diagram illustrating various method embodiments herein.

As shown in flowchart form in FIG. 1, one exemplary method embodiment herein senses the replacement of a used component with a new component (within an apparatus, such as a printing apparatus) using sensors within the apparatus in item 101. The method can then automatically display a message on a graphic user interface of the apparatus in response to sensing the replacement in item 103.

Figure 2:
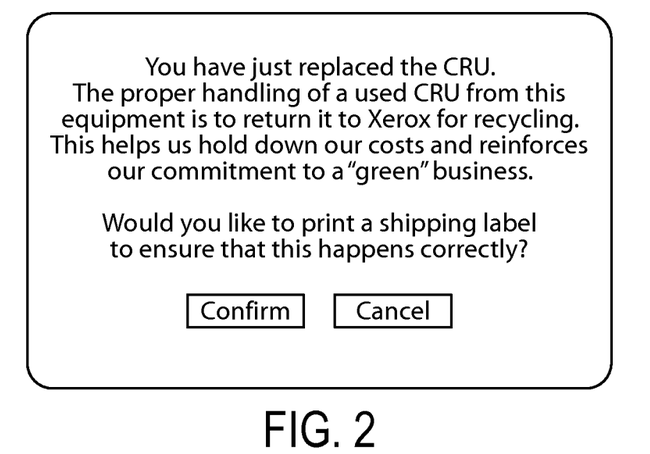
FIG. 2 is an exemplary screen shot according to embodiments herein.

This message provides information for recycling the used component, and the message provides a shipping option for shipping the used component to an appropriate recycling location. An exemplary screenshot of such a message is shown in FIG. 2. More specifically, in FIG. 2, the user is presented with the statement "You have just replaced the CRU. The proper handling of a used CRU from this equipment is to return it to Xerox for recycling. This helps us hold down our costs and reinforces our commitment to a "green" business. Would you like to print a shipping label to ensure that this happens correctly?"

Those ordinarily skilled in the art would understand that many different forms of questions could be presented to the user through the graphic user interface and the embodiments herein are not restricted to the limited number of examples presented herein. For example, another statement/question that could be presented is "You have just replaced the cyan toner bottle. The proper handling of an empty cyan toner bottle from this equipment is to return it to Xerox for refilling. This helps hold down our costs and reinforces our commitment to a "green" business. Would you like to print a shipping label to ensure that this happens correctly? If you still have the original box, please reuse it, if not you may ship it back in any appropriate size box you may have." Yet another example question/statement is "You have just replaced the web cassette. The proper handling of a used web cassette from this equipment is to ship it to a recycling center in your area. This reinforces our commitment to a "green" business. Xerox has a certified recycler in your area that we recommend. Would you like to print a shipping label to ensure that this happens correctly?"

Thus, when these messages are shown, the customer is presented with a choice to confirm or cancel the printing of the label. If the customer chooses to confirm the label printing (item 105), they are then instructed to load a sheet of label specific media (e.g., in the bypass tray) and select print, as shown in item 107.

If the shipping option is selected in item 105, the method retrieves a shipping address from memory within the apparatus or some external source and prints a shipping label for shipping the used component to the recycling location using a printing engine operatively connected to the apparatus (or positioned within the apparatus if, for example, the apparatus is the printing apparatus) in item 109.

There may be multiple geographic locations that accept the same component, and these multiple geographic locations may be stored within the memory of the apparatus. When retrieving the shipping address from memory within the apparatus in item 109, the embodiments herein can select the recycler location from such a plurality of recycling locations using of the processor within the apparatus. Further, when making this selection, the processor maintains a known geographical location of the printing apparatus (usually established during initial printer setup) and selects the recycler location to which shipping will occur based upon a closest proximity measurement between the geographical location of the printing apparatus and a geographical location of the recycler.

Therefore, embodiments herein can also provide notice to the user (through the graphic user interface) of physical locations where the used component can be dropped off for recycling. Therefore, for example, if a specific chain of printing shops is known to accept used customer replaceable units for recycling, the embodiments herein can provide a listing of locations of such printing shops to the user through the graphic user interface. Such a listing of shops could be presented in an order where the closest printing shop is listed first, and subsequent listings of printing shops that are displayed on the graphic user interface are sequentially further away from the geographic location of the printing apparatus which had its component replaced.

Figure 3:
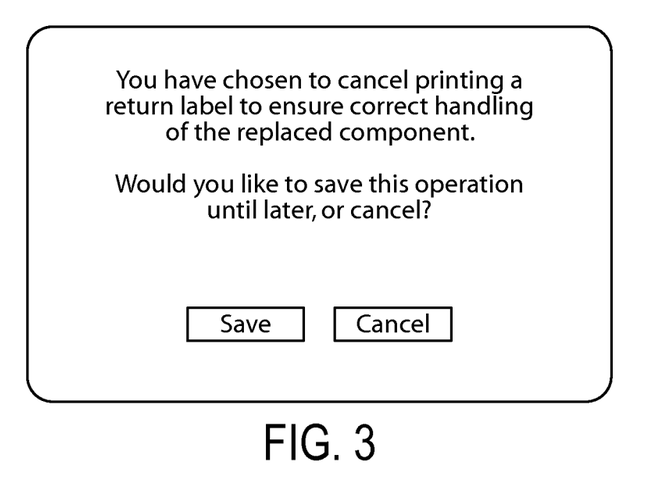
FIG. 3 is an exemplary screen shot according to embodiments herein.

With embodiments herein, it is also possible to have a "storage lot" for items so all items to be recycled can be processed at a later time. Thus, in some embodiments herein, the message also provides an option to accumulate a plurality of used components and to print the shipping label at a later time after a sufficient quantity of the used components has been accumulated (item 111). An exemplary screen shot of such an option is shown in FIG. 3 which states "You have chosen to cancel printing a return label to ensure correct handling of the replacement component. Would you like to save this operation until later, or cancel." This option allows the user to perform their recycling activities all at once in a batch form of activity.

Figure 4:
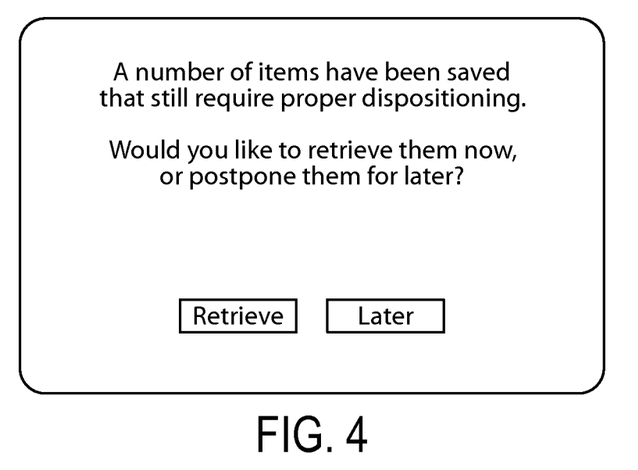
FIG. 4 is an exemplary screen shot according to embodiments herein.
Figure 5:
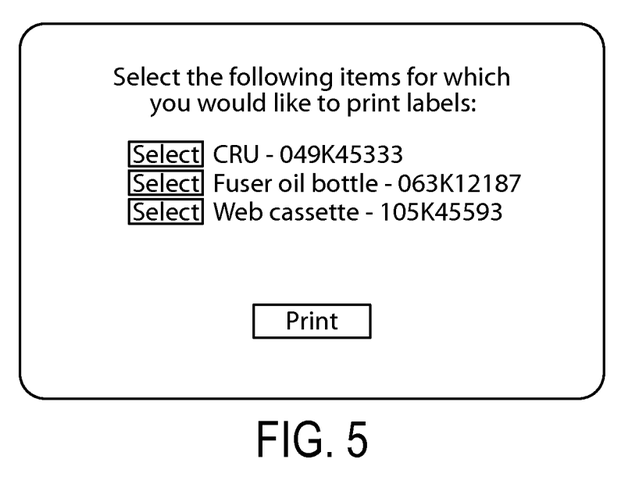
FIG. 5 is an exemplary screen shot according to embodiments herein.

Further, embodiments herein can provide reminder messages to print the shipping label if the option to accumulate was previously selected, as shown in item 113. An exemplary screenshot of such a message is shown in FIG. 4, which states: "A number of items have been saved that will require proper dispositioning. Would you like to retrieve them now or postpone them for later?" If the user selects the "retrieve" button, the screenshot shown in FIG. 5 appears, which states: "Select the following items for which you would like to print labels" followed by appropriate choices.

Should the customer choose cancel in items 105 and 111, they would be prompted to confirm that they have chosen to cancel in item 115 (similar to deleting a file and being asked if one is sure they want to delete the file).

Figure 6:
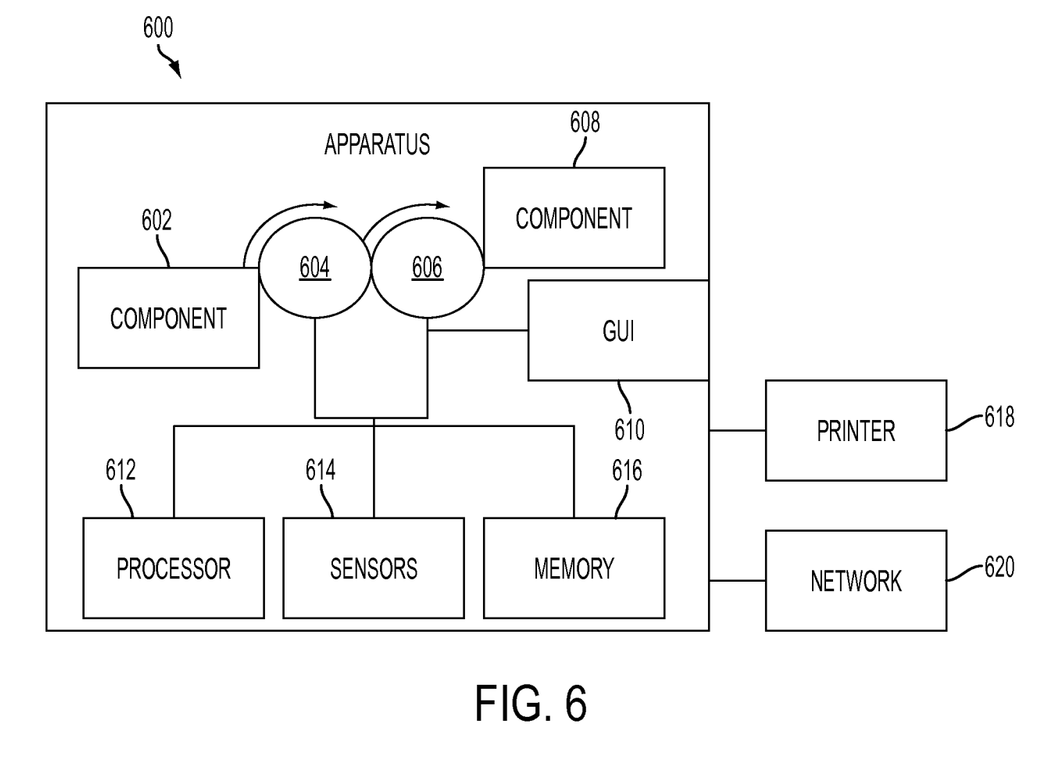
FIG. 6 is a side-view schematic diagram of a device according to embodiments herein.
Figure 7:
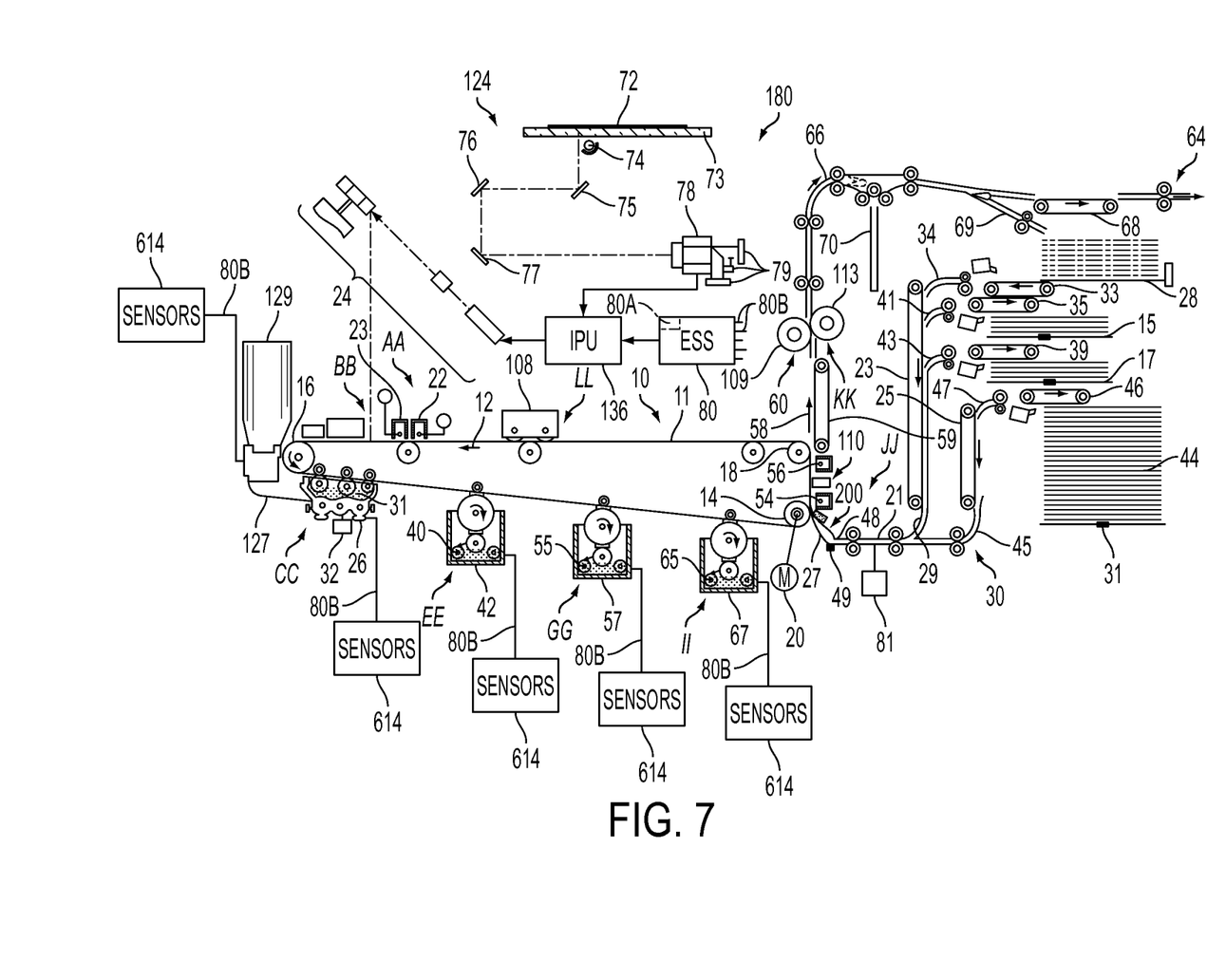
FIG. 7 is a side-view schematic diagram of a printing device according to embodiments herein.

One exemplary apparatus 600 herein is shown in FIG. 6 and includes a processor or controller 612. The apparatus 600 can comprise any form of device or apparatus that contains parts or components 602, 604, 606, 608 that can be periodically replaced either by the user, or by trained service personnel. A more specific embodiment (a printing apparatus) is shown in FIG. 7 and described below.

Sensors 614 that are positioned within the apparatus 600 are operatively connected to (directly or indirectly connected to) the processor 612. The sensors 614 detect replacement of a used component with a new component within the apparatus 600. Such sensors 614 are commonly known and can comprise specialized circuits or can comprise simple electrical connections that detect whether a component is connected or disconnected from the main apparatus 600. Thus, in one example, the processor 612 can detect when a component is electrically disconnected from the apparatus (potentially identifying such a component by a unique identifier, such as a serial number). If the electrical connection to the disconnected component is then restored (or if a component with a different serial is connected in its place) the processor 612 could then identify through the sensors 614 (e.g., electrical connections in this example) that a component has been replaced.

A graphic user interface 610 is also operatively connected to the processor 612. The graphic user interface 610 automatically displays a message in response to the sensing of the replacement of the used component as directed by the processor 612 and sensors 614. As shown above, the message provides information for recycling the used component, and the message provides a shipping option for shipping the used component to an appropriate recycling location.

A computer readable storage medium or memory 616 within the apparatus 600 is operatively connected to the processor 612. The computer readable storage medium 616 stores instructions that are executable by the processor 612 to perform the main function of the apparatus 600 and to perform the various processes described herein. The computer readable storage medium 616 can also store shipping addresses for different components within the apparatus 600. Alternatively, the apparatus 600 can be connected to a network 620 (which can be a local area network or a wide area network, such as the Internet). Therefore, the apparatus 600 can retrieve the shipping address from the network 620 to which it is connected.

With respect to the printing of the shipping label, many methodologies may be employed. For example, some conventional systems (U.S. Patent Publication 2004/0193436, the complete disclosure of which is incorporated herein by reference) provide a method of printing a label that permits the customer to drop the return package with a carrier without paying shipping charges to the carrier. The label includes an integrated machine readable code, which permits a returns center to easily assess shipping charges and perform other services related to the return. Other conventional systems (U.S. Patent Publication 2004/0212833, the complete disclosure of which is incorporated herein by reference) disclose a system and method for generating a carrier-compliant shipping label for a supplier to transport a product. The embodiments herein can use these or any similar methods and systems.

The user uses the shipping label to ship or mail (transport) the module to the appropriate agency. Thus, the return address that is stored in the memory 616 is used for shipping the used component back to the manufacturer or to a refurbishing/ recycling processor. Many times, the return label in item comprises a pre-paid shipping label.

Further, the software needed to accomplish the data processing can take many different forms. For example, U.S. Pat. No. 7,069,236, the complete disclosure of which is incorporated herein by reference, facilitate the return of spent, recyclable products from a consumer to a destination pre-selected by the manufacturer for recycling. Such a system uses a computer, located on a network, that is adapted to: (a) receive from another computer located on the network consumer information which includes an identification of the consumer product to be returned; and (b) transmit to the other computer shipping label data which includes an identification of a destination for the consumer product, selected in accordance with the consumer information, and an identification of a carrier service.

A printing engine or printer 618 can be positioned within or connected to the apparatus 600, and is also operatively connected to the processor 612. Note that in FIG. 6 a printer 618 is shown as being separate from the apparatus 600; however, in FIG. 7, the apparatus is a multi-function device that includes an internal printing engine. The printing engine 618 prints a shipping label for shipping the used component to the recycling location based on the shipping addresses, if the shipping option is selected.

With respect to a multi-function printing device embodiment, more specifically, FIG. 7 illustrates an exemplary electrostatic reproduction machine, for example, a multipass color electrostatic reproduction machine 180. As is well known, the color copy process typically involves a computer generated color image which may be conveyed to an image processor 136, or alternatively a color document 72 which may be placed on the surface of a transparent platen 73. A scanning assembly 124, having a light source 74 illuminates the color document 72. The light reflected from document 72 is reflected by mirrors 75, 76, and 77, through lenses (not shown) and a dichroic prism 78 to three charged-coupled linear photosensing devices (CCDs) 79 where the information is read. Each CCD 79 outputs a digital image signal the level of which is proportional to the intensity of the incident light. The digital signals represent each pixel and are indicative of blue, green, and red densities. They are conveyed to the IPU 136 where they are converted into color separations and bit maps, typically representing yellow, cyan, magenta, and black. IPU 136 stores the bit maps for further instructions from an electronic subsystem (ESS).

The ESS is preferably a self-contained, dedicated minicomputer having a central processor unit (CPU), computer readable storage medium (memory), and a display or graphic user interface (GUI) 83. The ESS is the control system which, with the help of sensors 614, and connections 80B as well as a pixel counter 80A, reads, captures, prepares and manages the image data flow between IPU 136 and image input terminal 124. Note that in FIG. 7, not all wiring and connections are illustrated to avoid clutter. In addition, the ESS 80 is the main multi-tasking processor for operating and controlling all of the other machine subsystems and printing operations. These printing operations include imaging, development, sheet delivery and transfer, and particularly control of the sequential transfer assist blade assembly. Such operations also include various functions associated with subsequent finishing processes. Some or all of these subsystems may have micro-controllers that communicate with the ESS 80.

The multipass color electrostatic reproduction machine 180 employs a photoreceptor 10 in the form of a belt having a photoconductive surface layer 11 on an electroconductive substrate. The surface 11 can be made from an organic photoconductive material, although numerous photoconductive surfaces and conductive substrates may be employed. The belt 10 is driven by means of motor 20 having an encoder attached thereto (not shown) to generate a machine timing clock. Photoreceptor 10 moves along a path defined by rollers 14, 18, and 16 in a counter-clockwise direction as shown by arrow 12.

Initially, in a first imaging pass, the photoreceptor 10 passes through charging station AA where a corona generating devices, indicated generally by the reference numeral 22, 23, on the first pass, charge photoreceptor 10 to a relatively high, substantially uniform potential. Next, in this first imaging pass, the charged portion of photoreceptor 10 is advanced through an imaging station BB. At imaging station BB, the uniformly charged belt 10 is exposed to the scanning device 24 forming a latent image by causing the photoreceptor to be discharged in accordance with one of the color separations and bit map outputs from the scanning device 24, for example black. The scanning device 24 is a laser Raster Output Scanner (ROS). The ROS creates the first color separatism image in a series of parallel scan lines having a certain resolution, generally referred to as lines per inch. Scanning device 24 may include a laser with rotating polygon mirror blocks and a suitable modulator, or in lieu thereof, a light emitting diode array (LED) write bar positioned adjacent the photoreceptor 10.

At a first development station CC, a non-interactive development unit, indicated generally by the reference numeral 26, advances developer material 31 containing carrier particles and charged toner particles at a desired and controlled concentration into contact with a donor roll, and the donor roll then advances charged toner particles into contact with the latent image and any latent target marks. Development unit 26 may have a plurality of magnetic brush and donor roller members, plus rotating augers or other means for mixing toner and developer. These donor roller members transport negatively charged black toner particles for example, to the latent image for development thereof which tones the particular (first) color separation image areas and leaves other areas untoned. Power supply 32 electrically biases development unit 26. Development or application of the charged toner particles as above typically depletes the level and hence concentration of toner particles, at some rate, from developer material in the development unit 26. This is also true of the other development units (to be described below) of the machine 180.

On the second and subsequent passes of the multipass machine 180, the pair of corona devices 22 and 23 are employed for recharging and adjusting the voltage level of both the toned (from the previous imaging pass), and untoned areas on photoreceptor 10 to a substantially uniform level. A power supply is coupled to each of the electrodes of corona recharge devices 22 and 23. Recharging devices 22 and 23 substantially eliminate any voltage difference between toned areas and bare untoned areas, as well as to reduce the level of residual charge remaining on the previously toned areas, so that subsequent development of different color separation toner images is effected across a uniform development field.

Imaging device 24 is then used on the second and subsequent passes of the multipass machine 180, to superimpose a subsequent latent image of a particular color separation image, by selectively discharging the recharged photoreceptor 10. The operation of imaging device 24 is of course controlled by the controller, ESS 80. One skilled in the art will recognize that those areas developed or previously toned with black toner particles will not be subjected to sufficient light from the imaging device 24 as to discharge the photoreceptor region lying below such black toner particles. However, this is of no concern as there is little likelihood of a need to deposit other colors over the black regions or toned areas.

Thus on a second pass, imaging device 24 records a second electrostatic latent image on recharged photoreceptor 10. Of the four development units, only the second development unit 42, disposed at a second developer station EE, has its development function turned "on" (and the rest turned "off") for developing or toning this second latent image. As shown, the second development unit 42 contains negatively charged developer material 40, for example, one including yellow toner. The toner 40 contained in the development unit 42 is thus transported by a donor roll to the second latent image recorded on the photoreceptor 10, thus forming additional toned areas of the particular color separation on the photoreceptor 10. A power supply (not shown) electrically biases the development unit 42 to develop this second latent image with the negatively charged yellow toner particles 40. As will be further appreciated by those skilled in the art, the yellow colorant is deposited immediately subsequent to the black so that further colors that are additive to yellow, and interact therewith to produce the available color gamut, can be exposed through the yellow toner layer.

On the third pass of the multipass machine 180, the pair of corona recharge devices 22 and 23 are again employed for recharging and readjusting the voltage level of both the toned and untoned areas on photoreceptor 10 to a substantially uniform level. A power supply is coupled to each of the electrodes of corona recharge devices 22 and 23. The recharging devices 22 and 23 substantially eliminate any voltage difference between toned areas and bare untoned areas, as well as to reduce the level of residual charge remaining on the previously toned areas so that subsequent development of different color toner images is effected across a uniform development field. A third latent image is then again recorded on photoreceptor 10 by imaging device 24. With the development functions of the other development units turned "off", this image is developed in the same manner as above using a third color toner 55 contained in a development unit 57 disposed at a third developer station GG. An example of a suitable third color toner is magenta. Suitable electrical biasing of the development unit 57 is provided by a power supply, not shown.

On the fourth pass of the multipass machine 180, the pair of corona recharge devices 22 and 23 again recharge and adjust the voltage level of both the previously toned and yet untoned areas on photoreceptor 10 to a substantially uniform level. A power supply is coupled to each of the electrodes of corona recharge devices 22 and 23. The recharging devices 22 and 23 substantially eliminate any voltage difference between toned areas and bare untoned areas as well as to reduce the level of residual charge remaining on the previously toned areas. A fourth latent image is then again created using imaging device 24. The fourth latent image is formed on both bare areas and previously toned areas of photoreceptor 10 that are to be developed with the fourth color image. This image is developed in the same manner as above using, for example, a cyan color toner 65 contained in development unit 67 at a fourth developer station II. Suitable electrical biasing of the development unit 67 is provided by a power supply, not shown.

Following the black development unit 26, development units 42, 57, and 67 are preferably of the type known in the art which do not interact, or are only marginally interactive with previously developed images. For examples, a DC jumping development system, a powder cloud development system, or a sparse, non-contacting magnetic brush development system are each suitable for use in an image on image color development system as described herein. In order to condition the toner for effective transfer to a substrate, a negative pre-transfer corotron member negatively charges all toner particles to the required negative polarity to ensure proper subsequent transfer.

Since the machine 180 is a multicolor, multipass machine as described above, only one of the plurality of development units, 26, 42, 57 and 67 may have its development function turned "on" and operating during any one of the required number of passes, for a particular color separation image development. The remaining development units thus have their development functions turned off.

During the exposure and development of the last color separation image, for example by the fourth development unit 65, 67 a sheet of support material is advanced to a transfer station JJ by a sheet feeding apparatus 30. During simplex operation (single sided copy), a blank sheet may be fed from tray 15 or tray 17, or a high capacity tray 44 could thereunder, to a registration transport 21, in communication with controller 81, where the sheet is registered in the process and lateral directions, and for skew position. As shown, the tray 44 and each of the other sheet supply sources includes a sheet size sensor 31 that is connected to the controller 80. One skilled in the art will realize that trays 15, 17, and 44 each hold a different sheet type.

The speed of the sheet is adjusted at registration transport 21 so that the sheet arrives at transfer station JJ in synchronization with the composite multicolor image on the surface of photoconductive belt 10. Registration transport 21 receives a sheet from either a vertical transport 23 or a high capacity tray transport 25 and moves the received sheet to pretransfer baffles 27. The vertical transport 23 receives the sheet from either tray 15 or tray 17, or the single-sided copy from duplex tray 28, and guides it to the registration transport 21 via a turn baffle 29. Sheet feeders 35 and 39 respectively advance a copy sheet from trays 15 and 17 to the vertical transport 23 by chutes 41 and 43. The high capacity tray transport 25 receives the sheet from tray 44 and guides it to the registration transport 21 via a lower baffle 45. A sheet feeder 46 advances copy sheets from tray 44 to transport 25 by a chute 47.

As shown, pretransfer baffles 27 guide the sheet from the registration transport 21 to transfer station JJ. Charge can be placed on the baffles from either the movement of the sheet through the baffles or by the corona generating devices 54, 56 located at marking station or transfer station JJ. Charge limiter 49 located on pretransfer baffles 27 and 48 restricts the amount of electrostatic charge a sheet can place on the baffles 27 thereby reducing image quality problems and shock hazards. The charge can be placed on the baffles from either the movement of the sheet through the baffles or by the corona generating devices 54, 56 located at transfer station JJ. When the charge exceeds a threshold limit, charge limiter 49 discharges the excess to ground.

Transfer station JJ includes a transfer corona device 54 which provides positive ions to the backside of the copy sheet. This attracts the negatively charged toner powder images from photoreceptor belt 10 to the sheet. A detack corona device 56 is provided for facilitating stripping of the sheet from belt 10. A sheet-to-image registration detector 110 is located in the gap between the transfer and corona devices 54 and 56 to sense variations in actual sheet to image registration and provides signals indicative thereof to ESS 80 and controller 81 while the sheet is still tacked to photoreceptor belt 10.

The transfer station JJ also includes the transfer assist blade assembly 200, in which various segmented blades are engaged for contacting the backside of the image receiving sheet. After transfer, the sheet continues to move, in the direction of arrow 58, onto a conveyor 59 that advances the sheet to fusing station KK.

Fusing station KK includes a fuser assembly, indicated generally by the reference numeral 60, which permanently fixes the transferred color image to the copy sheet. Preferably, fuser assembly 60 comprises a heated fuser roller 109 and a backup or pressure roller 113. The copy sheet passes between fuser roller 109 and backup roller 113 with the toner powder image contacting fuser roller 109. In this manner, the multi-color toner powder image is permanently fixed to the sheet. After fusing, chute 66 guides the advancing sheet to feeder 68 for exit to a finishing module (not shown) via output 64. However, for duplex operation, the sheet is reversed in position at inverter 70 and transported to duplex tray 28 via chute 69. Duplex tray 28 temporarily collects the sheet whereby sheet feeder 33 then advances it to the vertical transport 23 via chute 34. The sheet fed from duplex tray 28 receives an image on the second side thereof, at transfer station JJ, in the same manner as the image was deposited on the first side thereof. The completed duplex copy exits to the finishing module (not shown) via output 64.

After the sheet of support material is separated from photoreceptor 10, the residual toner carried on the photoreceptor surface is removed therefrom. The toner is removed for example at cleaning station LL using a cleaning brush structure contained in a unit 108.

Figure 8:
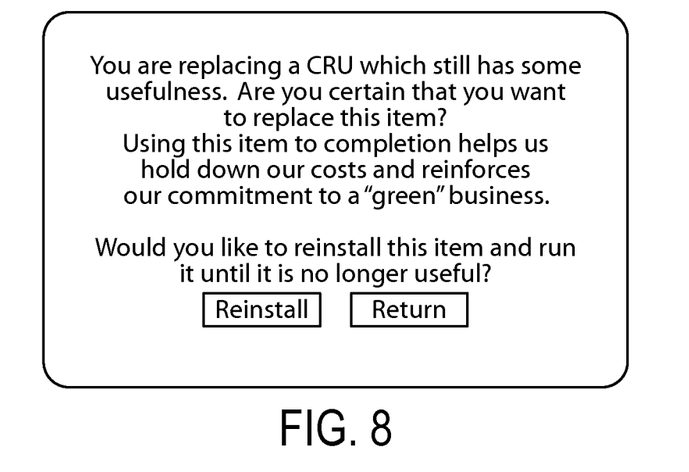
FIG. 8 is an exemplary screen shot according to embodiments herein.

As discussed above, sensors 614 detect replacement of a used component with a new component within the printing apparatus. The graphic user interface 83 is also operatively connected to the processor 80. The graphic user interface 83 automatically displays a message in response to the sensing of the replacement of the used component as directed by the processor 80 and sensors 614. As shown above, the message provides information for recycling the used component, and the message provides a shipping option for shipping the used component to an appropriate recycling location. Also, FIG. 7 illustrates a printing engine within the printing apparatus, that is used to print the shipping labels To further increase the environmental friendliness of the embodiments herein, the customer can be encouraged to fully use components and not prematurely replace components that still have useful life. Therefore, if a component that still has useful life is inadvertently (or mistakenly) replaced by a user, the embodiments herein provide a message on the user interface encouraging the customer to reconsider using the component until it is completely used up. FIG. 8 illustrates an exemplary screen shot of such a message which reads: You are replacing a CRU which still has some usefulness. Are you certain that you want to replace this item? Using this item to completion helps us hold down our costs and reinforces our commitment to "green" business. Would you like to reinstall this item and run it until it is no longer useful? This feature can be combined with any of the foregoing embodiments.

Thus, the embodiments herein use the current technology in a more comprehensive way and provide access to correct shipping information very easily and at the time when a component is being replaced. With the embodiments herein, there is no need to access information from a computer (away from the machine) or be networked (a practice to which some customers are averse). The embodiments herein increase the amount of properly returned parts and assemblies, increase the supply of reman and reusable "hulks", reinforce the commitment to help save the environment by responsibly performing recycling, creates a marketing opportunity by leveraging the current trend of sustainable business and environment, and promote the possible sale of another consumable (label paper, etc.).

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art. The embodiments herein can encompass embodiments that print in color, monochrome, or handle color or monochrome image data. All foregoing embodiments are specifically applicable to electrostatographic and/or xerographic machines and/or processes, but could apply to direct marking, ink jet and solid ink processes as well.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A method comprising:
   sensing replacement of a used component with a new component within a printing apparatus, using sensors within said printing apparatus;
   automatically displaying a message on a graphic user interface of said printing apparatus in response to said sensing of said replacement, said message providing information for recycling said used component, and said message providing a shipping option for shipping said used component to an appropriate recycling location; and
   if said shipping option is selected, retrieving a shipping address and printing a shipping label for shipping said used component to said recycling location using a printing engine within said printing apparatus.

2. The method according to claim 1, said message providing an option to accumulate a plurality of used components and to print said shipping label at a later time after a sufficient quantity of said use components has been accumulated.

3. The method according to claim 2, further comprising providing reminder messages to print said shipping label if said option to accumulate was previously selected.

4. The method according to claim 1, further comprising selecting said recycling location from a plurality of recycling locations using of a processor within said printing apparatus.

5. The method according to claim 4, said processor maintaining a known geographical location of said printing apparatus and selecting said recycling location based upon a closest proximity measurement between said geographical location of said printing apparatus and a geographical location of said recycling location.

6. A method comprising:
   sensing replacement of a used component with a new component within a printing apparatus, using sensors within said printing apparatus;
   selecting a recycling location for said used component from a plurality of recycling locations stored within a computer readable storage medium of said printing apparatus using of a processor within said printing apparatus;
   automatically displaying a message on a graphic user interface of said printing apparatus in response to said sensing of said replacement, said message providing information for recycling said used component, and said message providing a shipping option for shipping said used component to said recycling location; and
   if said shipping option is selected, retrieving a shipping address from said computer readable storage medium and printing a shipping label for shipping said used component to said recycling location using a printing engine within said printing apparatus.

7. The method according to claim 6, said message providing an option to accumulate a plurality of used components and to print said shipping label at a later time after a sufficient quantity of said use components has been accumulated.

8. The method according to claim 7, further comprising providing reminder messages to print said shipping label if said option to accumulate was previously selected.

9. The method according to claim 6, said processor maintaining a known geographical location of said printing apparatus and selecting said recycling location based upon a closest proximity measurement between said geographical location of said printing apparatus and a geographical location of said recycling location.

10. A printing apparatus comprising:
    a processor;
    sensors positioned within said printing apparatus and operatively connected to said processor, said sensors detecting replacement of a used component with a new component within said printing apparatus; and
    a graphic user interface operatively connected to said processor, said graphic user interface automatically displaying a message in response to said detecting of said replacement of said used component as directed by said processor, said message providing information for recycling said used component, and said message providing a shipping option for shipping said used component to an appropriate recycling location,
    if said shipping option is selected, said processor causing a shipping label for shipping said used component to said recycling location to be printed using a printing engine within said printing apparatus.

11. The printing apparatus according to claim 10, said message providing an option to accumulate a plurality of used components and to print said shipping label at a later time after a sufficient quantity of said use components has been accumulated.

12. The printing apparatus according to claim 11, said graphic user interface providing reminder messages to print said shipping label as directed by said processor if said option to accumulate was previously selected.

13. The printing apparatus according to claim 10, said processor selecting said recycling location from a plurality of recycling locations.

14. The printing apparatus according to claim 13, said processor maintaining a known geographical location of said printing apparatus and selecting said recycling location based upon a closest proximity measurement between said geographical location of said printing apparatus and a geographical location of said recycling location.

15. A printing apparatus comprising:
    a processor;
    sensors positioned within said printing apparatus and operatively connected to said processor, said sensors detecting replacement of a used component with a new component within said printing apparatus;
    a computer readable storage medium within said printing apparatus and operatively connected to said processor, said computer readable storage medium storing shipping addresses for different components within said printing apparatus, said processor selecting a recycling location for said used component from a plurality of recycling locations stored within said computer readable storage medium;
    a graphic user interface operatively connected to said processor, said graphic user interface automatically displaying a message in response to said detecting of said replacement of said used component as directed by said processor, said message providing information for recycling said used component, and said message providing a shipping option for shipping said used component to an appropriate recycling location; and a printing engine within said apparatus and operatively connected to said processor, said printing engine printing a shipping label for shipping said used component to said recycling location based on said shipping addresses within said computer readable storage medium, if said shipping option is selected.

16. The printing apparatus according to claim 15, said processor maintaining a known geographical location of said printing apparatus and selecting said recycling location based upon a closest proximity measurement between said geographical location of said printing apparatus and a geographical location of said recycling location.

17. The printing apparatus according to claim 15, said message providing an option to accumulate a plurality of used components and to print said shipping label at a later time after a sufficient quantity of said use components has been accumulated.

18. The printing apparatus according to claim 17, said graphic user interface providing reminder messages to print said shipping label as directed by said processor if said option to accumulate was previously selected.

* * * * *